United States Patent

[11] 3,619,047

| [72] | Inventor | Karl Neudecker |
| | | Munich, Germany |
| [21] | Appl. No. | 875,708 |
| [22] | Filed | Nov. 12, 1969 |
| [45] | Patented | Nov. 9, 1971 |
| [73] | Assignee | AGFA-Gevaert Aktiengesellschaft |
| | | Leverkusen, Germany |
| [32] | Priority | Nov. 14, 1968 |
| [33] | | Germany |
| [31] | | G 68 06 909 |

[54] MOTION PICTURE CAMERA WITH FILM FRAME COUNTER
10 Claims, 3 Drawing Figs.

[52] U.S. Cl. .................................................. 352/172, 116/114 J
[51] Int. Cl. ...................................................... G03b 1/60
[50] Field of Search .......................................... 352/172, 170; 95/31 FM; 235/91 C; 116/114 J, 115

[56] References Cited
UNITED STATES PATENTS
| 2,959,091 | 11/1960 | Richartz | 352/172 X |
| 2,967,471 | 1/1961 | Sommermeyer | 235/91 C X |
| 3,150,377 | 9/1964 | Keznickl | 352/172 |

Primary Examiner—Louis R. Prince
Assistant Examiner—Joseph W. Roskos
Attorney—Michael S. Striker ABSTRACT: A frame counter for 8-millimeter motion picture film which comprises two coaxial toothed disks one of which is provided with indicia representing different numbers of film frames and the other of which has alternating deeper and shallower tooth spaces. A pawl is driven by the film-transporting mechanism of the camera to repeatedly index the other disk and to index the one disk only when its pallet extends into a deeper tooth space.

INVENTOR.
KARL NEUDECKER

MOTION PICTURE CAMERA WITH FILM FRAME COUNTER

BACKGROUND OF THE INVENTION

The present invention relates to photographic cameras in general, and more particularly to improvements in film frame counters for use in motion picture cameras, especially in motion picture cameras for 8-millimeter film.

The frame counter of a motion picture camera normally comprises a disk which is provided with indicia representing different numbers of film frames and is indexed by the film-transporting mechanism to move successive indicia past an observation window. Problems arise when a motion picture camera is to be used with magazines or reels containing motion picture film of standard length or motion picture film of greater than standard length (known as thin film). A conventional frame counter can indicate the number of frames in a film of standard length, normally in such a way that the indicia or numerals indicating the number of exposed or unexposed frames on film of standard length form a circle. The disk completes a full revolution in response to exposure of all frames on a film of normal length. If a camera embodying such a frame counter is used with motion picture film of greater than standard length, the disk must complete two or more revolutions so that the user of the camera must be careful to observe the visible numeral on the disk and to memorize the number of revolutions of the disk. For example, if the film used in the camera is of two times standard length, the numerals which are observable during the first revolution of the disk will indicate the number of exposed or unexposed frames in the first half of the film and the numerals which can be seen during the second revolution of the disk will indicate the number of exposed or unexposed frames in the second half of such film. If the user forgets to remember whether or not the disk has already completed one revolution, he has no way of determining the number of remaining unexposed frames or the total number of exposed frames.

SUMMARY OF THE INVENTION

An object of the invention is to provide a motion picture camera, especially a camera for use with 8-millimeter film, with a frame counter which can properly indicate the number of exposed and/or unexposed film frames regardless of whether the camera is loaded with film of standard length or with film of greater than standard length.

Another object of the invention is to provide a frame counter which is simple, which occupies little room, which comprises a small number of parts, and which can be read and its indicia comprehended with the same facility as in presently known frame counters for film of standard length.

A further object of the invention is to provide a frame counter which can receive motion from conventional film transporting mechanisms for motion picture film.

An additional object of the invention is to provide a novel motion-transmitting connection between the improved frame counter and the film-transporting mechanism of a motion picture camera.

Still another object of the invention is to provide a frame counter for use with film of standard or greater than standard length which can be reset in automatic response to removal of exposed film from the housing of a motion picture camera.

The invention is embodied in a motion picture camera, particularly for use with a 8-millimeter film, which comprises a film-transporting assembly operative to transport the film lengthwise, a film frame counter including a plurality of indexible means, and a motion-transmitting device receiving motion from the film-transporting assembly and operative to index at least one of the indexible means in response to each transport of the film by the length of a frame. In accordance with a feature of the invention, the indexible means include indicia-bearing first indexible means and second indexible means which latter is indexible by the motion-transmitting device between a plurality of first and second positions and maintains the motion-transmitting device out of engagement with the first indexible means in the first positions thereof so that the first indexible means is indexed by the motion-transmitting device only in the second positions of the second indexible means. In this way, indexing of the first indexible means through 180° can take place in response to complete exposure of a film of standard length and the first indexible means is indexed through 360° in response to exposure film of twice the standard length. If the first indexible means is indexed in response to each third, fourth, etc. indexing of the second indexible means, the frame counter can be used to indicate the number of exposed and/or unexposed film frames on the film of three, four or more times standard length.

The novel features which are considered as characteristic of the invention are set forth in particular in the appended claims. The improved motion picture camera itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
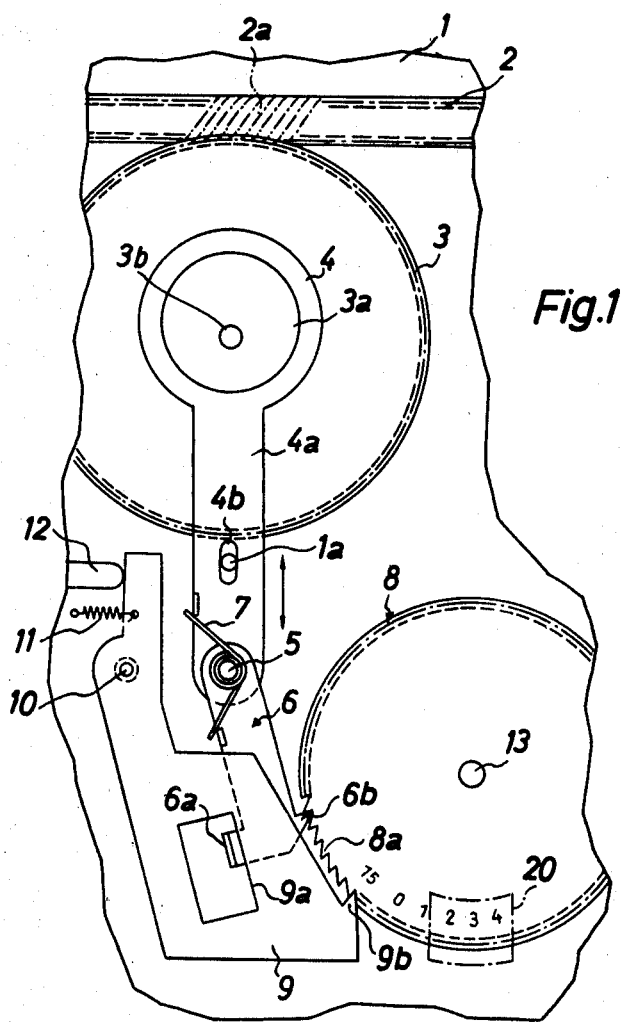
FIG. 1 is a fragmentary elevational view of a motion picture camera which embodies the improved frame counter, with the second indexible means omitted.

Referring to FIG. 1, there is shown a portion of a motion picture camera for use with 8-millimeter film. The camera comprises a housing or body 1 which accommodates a conventional film-transporting assembly including a main drive shaft 2 having a portion 2a which constitutes a worm serving to drive a worm wheel 3 mounted on a shaft 3b. The main shaft 2 rotates the customary shutter (not shown) and a claw pulldown (not shown) which transports the film past the film gate so that an unexposed frame is in registry with the gate whenever the shutter admits scene light. The shaft 2 is preferably driven by an electric motor or a spring motor. The worm 2a and the worm wheel 3 form part of a motion-transmitting device further including an eccentric 3a which is rigid with the worm wheel 3 and is surrounded by a strap 4 having an arm 4a which performs reciprocatory movements in response to rotation of the eccentric 3a. The arm 4a has an elongated slot 4b receiving a fixed guide pin 1a. The lower end of the arm 4a carries a pivot pin 5 for a pawl 6 which constitutes the output member of the motion-transmitting device and has a pallet 6b performing recurrent movements along a predetermined path in response to successive rotations of the eccentric 3a. Each such rotation of the eccentric 3a corresponds to lengthwise transport of motion picture film (not shown) by the length of a frame. The pawl 6 is biased in a counterclockwise direction, as viewed in FIG. 1, by a torsion spring 7 which is convoluted around the pivot pin 5. A follower 6a of the pawl 6 tracks a face 9a provided on a blocking pawl 9 which is fulcrumed in the housing 1, as at 10, and is biased by a spring 11. A pusher 12 or a like actuating device can be displaced in a direction to the right in response to opening of the cover on the housing for the purpose of removing exposed film.

The improved frame counter comprises several indexible means each constituting a rotary member or disk having an annulus of projections in the form of ratchet teeth. FIG. 1 merely shows a first rotary member 8 having teeth 8a and rotatable on a shaft 13. The indicia shown on the front surface of the disk 8 are numerals at least one of which is observable in a window 20 installed in the housing 1 and preferably provided with a stationary reference mark, not shown. The indicia on the disk 8 are intended to indicate the total number of frames on a film of two times standard length. A spring (not shown) tends to rotate the disk 8 in a counterclockwise direction, but such rotation is normally prevented by the pallet 9b of the blocking pawl 9. When the cover of housing 1 is opened, the pusher 12 pivots the pawl 9 in a clockwise direction against the opposition of the spring 11 whereby the pawl 9 permits the disk 8 to rotate in a counter clockwise direction and to assume its zero position. When the pusher 12 pivots the pawl 9, the face 9a of the pawl 9 engages the follower 6a and pivots the pawl 6 against the opposition of the spring 7 so that the pawl 6 cannot interfere with return movement of the disk 8 to its zero position.

In a conventional camera, the frame counter merely comprises the structure shown in FIG. 1, i.e., a single disk 8 which is indexed in response to each rotation of the eccentric 3a so that the disk 8 moves a different numeral into registry with the window 8 in response to each transport of the film by the length of a frame. This means that, if the film is very long, the frame counter must employ a large-diameter disk because the angular displacement of the disk in response to each indexing is very small. As stated before, the disk of a conventional frame counter normally completes a full revolution in response to exposure of all frames on a film of standard length.

Figure 2:
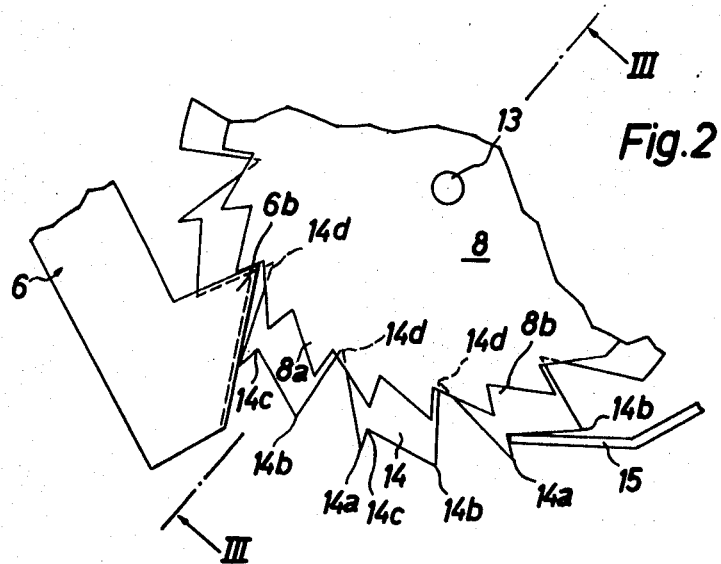
FIG. 2 is an enlarged view of a detail in the structure of FIG. 1, further showing the second indexible means.
Figure 3:
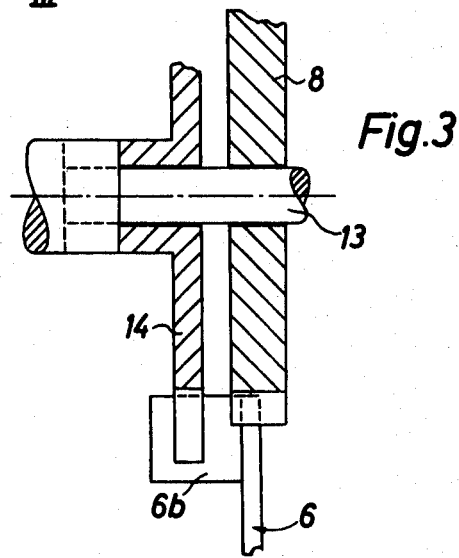
FIG. 3 is an enlarged fragmentary sectional view as seen in the direction of arrows from the line III—III of FIG. 2.

Referring to FIGS. 2 and 3, the improved frame counter further comprises a second indexible means 14 which is a disk mounted coaxially with and rotatable relative to the disk 8. A leaf spring 15 or a like blocking device is provided to hold the disk 14 against rotation in a counterclockwise direction. As shown in FIG. 3, the pallet 6b of the pawl 6 is wide enough to simultaneously engage a projection or tooth 8a of the disk 8 and a projection or tooth 14a or 14b of the disk 8. The tips of teeth 14a, 14b extend radially beyond the tips of teeth 8a and the combined number of teeth 14a, 14b equals (but need not equal) the number of teeth 8a. The tooth spaces 14c which are adjacent to the radial flanks of the teeth 14a are shallower that the tooth spaces 14d which are adjacent to the radial flanks of the teeth 14b. It will be seen that the deeper tooth spaces 14d alternate with the shallower tooth spaces 14c and that the deepmost zones of the tooth spaces 14d are located radially inwardly of or are aligned with the tooth spaces 8b between the teeth 8a of the disk 8.

When the film-transporting assembly is c, operation to transport the film lengthwise, the worm 2a of the main shaft 2 drives the worm wheel 3 and causes the eccentric 3a to reciprocate the arm 4a of the motion-transmitting device. The pallet 6b of the pawl 6 travels along a predetermined path in response to each rotation of the eccentric 3a and enter successive tooth spaces 14c, 14d, 14c, 14d, etc. of the second disk 14. Thus, the disk 14 is indexed once for each film frame.

When the disk 14 assumes one of those positions in which the pallet 6b extends into one of the shallower tooth spaces 14c, the pallet 6b is held out of engagement with the teeth 8a of the indicia-bearing disk 8 so that the latter is not indexed at all. However, when the disk 14 assumes one of those positions in which the pallet 6b extends into one of the deeper tooth spaces 14d, the pallet 6b also extends into one of the tooth spaces 8b and can index the disk 8 together with the disk 14 so that the disk 8 moves a different numeral into registry with the window 20. The pallet 6b thereupon travels along the inclined flank of the adjoining tooth 14a and enters the next-following shallower space 14c to thereupon index the disk 14 independently of the disk 8. The same procedure is repeated again and again as long as the shaft 2 continues to move the pawl 6.

As explained hereinbefore, the disk 14 can be designed in such a way that it permits indexing of the indicia-bearing disk 8 in response to each third, fourth, etc. revolution of the eccentric 3a. Thus, the frame counter can be used in cameras which can expose frames on motion picture film of standard length or twice, three times, four times, etc. standard length. The number of teeth on the disk 14 can be less than the number of teeth on the disk 8.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims:

1. In a photographic apparatus, particularly in motion picture camera for use with 8-millimeter film, a combination comprising a film-transporting assembly operative to transport the film lengthwise; a film frame counter including a plurality of indexible means; and a motion-transmitting device receiving motion from said film-transporting assembly and operative to index at least one of said indexible means in response to each transport of the film by the length of a frame, said indexible means including indicia-bearing first indexible means and second indexible means which is indexible by said motion-transmitting device between a plurality of first and second positions and maintains said motion-transmitting device out of engagement with said first indexible means in said first positions thereof so that said first indexible means is indexed by said motion-transmitting device only in the second positions of said second indexible means.

2. A combination as defined in claim 1, wherein said first and second indexible means respectively comprise coaxial first and second rotary members and said motion-transmitting device comprises an output member arranged to perform a predetermined movement in response to each transport of the film by the length of a frame, said first and second rotary members respectively having first and second annuli of projections and said output member being arranged to engage successive projections of said second rotary member in response to successive movements thereof and to engage successive projections of said first rotary member during those movements thereof which take place when said second rotary member assumes one of said second positions.

3. A combination as defined in claim 2, wherein the number of projections on said second rotary member equals the number of projections on said first rotary member.

4. A combination as defined in claim 2, wherein said projections are teeth which are separated by tooth spaces and wherein the tooth spaces of said second rotary member include shallower and deeper spaces, said second rotary member respectively assuming one of said first and second positions when said output member respectively extends into one of said shallower and deeper spaces.

5. A combination as defined in claim 4, wherein said deeper tooth spaces alternate with said shallower tooth spaces.

6. A combination as defined in claim 4, wherein the teeth of said second rotary member extend radially beyond the teeth of said first rotary member, 7. A combination as defined in claim 1, wherein said first and second indexible means respectively comprise first and second rotary toothed disks and wherein said disks are coaxial with and rotatable relative to each other.

8. A combination as defined in claim 7, further comprising blocking means for normally holding each of said disks against rotation in one direction.

9. A combination as defined in claim 7, further comprising means for disengaging said blocking means from said first disk.

10. A combination as defined in claim 7, wherein said motion-transmitting device comprises a pawl having a pallet and means for moving said pallet along a predetermined path in response to each transport of the film by the length of a frame, said disks being adjacent to said path and said pallet engaging successive teeth of said second disk during successive movements thereof and engaging the teeth of said first disk in successive second positions of said second disk.

\* \* \* \* \*